United States Patent
Cha et al.

(10) Patent No.: US 10,565,814 B2
(45) Date of Patent: Feb. 18, 2020

(54) METHOD FOR PROVIDING VEHICLE SERVICE

(71) Applicant: REDPALLCAR CO., LTD., Seoul (KR)

(72) Inventors: Wonyoung Cha, Seoul (KR); Wonik Kim, Yangpyeong-gun (KR)

(73) Assignee: REDPALLCAR CO., LTD., Seoul (KR)

( * ) Notice: Subject to any disclaimer, the term of this patent is extended or adjusted under 35 U.S.C. 154(b) by 509 days.

(21) Appl. No.: 15/236,325

(22) Filed: Aug. 12, 2016

(65) Prior Publication Data
US 2017/0046672 A1  Feb. 16, 2017

(30) Foreign Application Priority Data
Aug. 13, 2015 (KR) .......................... 10-2015-0114892

(51) Int. Cl.
*G07B 15/02* (2011.01)
*G06Q 20/32* (2012.01)
(Continued)

(52) U.S. Cl.
CPC ............ *G07C 9/00896* (2013.01); *G06F 7/06* (2013.01); *G06K 9/00825* (2013.01);
(Continued)

(58) Field of Classification Search
CPC ............ G06Q 20/102; G06Q 2240/00; G08G 1/0175; G08G 1/017; G06F 7/06; G07C 9/00896; G07B 15/02
(Continued)

(56) References Cited

U.S. PATENT DOCUMENTS

| | | | |
|---|---|---|---|
| 2004/0039632 A1 | 2/2004 | Han et al. | |
| 2012/0323643 A1* | 12/2012 | Volz | G07B 15/02 705/13 |
| 2013/0182110 A1* | 7/2013 | Tziperman | H04N 7/18 348/148 |

FOREIGN PATENT DOCUMENTS

| | | |
|---|---|---|
| CN | 102855671 A | 1/2013 |
| CN | 103778677 A | 5/2014 |

(Continued)

OTHER PUBLICATIONS

Sushama Karumanchi et. al.; Privacy-aware access control for message exchange in vehicular ad hoc networks; Nov. 22, 2014 (Year: 2014).*

(Continued)

*Primary Examiner* — Rupangini Singh
*Assistant Examiner* — Dione N. Simpson
(74) *Attorney, Agent, or Firm* — Maschoff Brennan

(57) ABSTRACT

A vehicle service providing device for controlling a first client that controls a first vehicle number recognizer using a first vehicle number recognizing method and a second client that controls a second vehicle number recognizer using a second vehicle number recognizing method. The vehicle service providing device includes: a message acquisition unit configured to obtain a message transmitted/received between an operating system (OS) of the first client and a control program of the first client wherein the message is generated from the OS or the control program according to an event occurring from the first client and transmitted/received between a message queue of the OS and a message queue of the control program; and an information extraction unit configured to analyze the message based on information on a structure of the message and extract information on a (Continued)

target vehicle recognized by the first vehicle number recognizer from the analyzed message.

11 Claims, 17 Drawing Sheets

(51) Int. Cl.
 *G08G 1/017* (2006.01)
 *G07F 17/24* (2006.01)
 *G06F 7/08* (2006.01)
 *G07B 15/06* (2011.01)
 *G07C 9/00* (2020.01)
 *G06K 9/00* (2006.01)
 *G06F 7/06* (2006.01)

(52) U.S. Cl.
 CPC ..... *G06Q 20/3224* (2013.01); *G06Q 2240/00* (2013.01); *G07B 15/02* (2013.01); *G07F 17/24* (2013.01); *G08G 1/017* (2013.01)

(58) Field of Classification Search
 USPC .......................................................... 705/13
 See application file for complete search history.

(56) References Cited

FOREIGN PATENT DOCUMENTS

| CN | 103839300 A | 6/2014 |
|---|---|---|
| CN | 104361646 A | 2/2015 |
| CN | 104766477 A | 7/2015 |
| KR | 10-2003-0030853 A | 4/2003 |
| KR | 10-2004-0054022 A | 6/2004 |
| KR | 10-2011-0133755 A | 12/2011 |
| KR | 10-1365762 B1 | 3/2014 |
| KR | 10-2014-0047248 A | 4/2014 |
| KR | 10-2014-0145670 A | 12/2014 |
| WO | 03/039040 A1 | 5/2003 |

OTHER PUBLICATIONS

Sulata Mitra; Joint Congestion Control Strategy During V2V Communication Among Authentic Vehicles in VANET; May 29, 2014 Year: 2014).*
Stevan Stankovski et al.; Bluetooth parking access control; vol. 34 • No. 3 • 2014 • 244-254 (Year: 2014).*
Journal of Engineering ; Atlanta; Jan. 22, 2014 (Year: 2014).*
Chinese Office Action issued in corresponding application No. 201610664464.1, dated Jun. 22, 2018.

* cited by examiner

METHOD FOR PROVIDING VEHICLE SERVICE

CROSS-REFERENCE TO RELATED PATENT APPLICATION

This application claims the benefit of Korean Patent Application No. 10-2015-0114892, filed on Aug. 13, 2015, in the Korean Intellectual Property Office, the disclosure of which is incorporated herein in its entirety by reference.

BACKGROUND OF THE INVENTION

Field of the Invention

The present invention relates to method for providing vehicle service.

Description of the Related Art

As people using vehicles are increased, a vehicle number recognizer for recognizing a vehicle number is greatly developed. Such a vehicle number recognizer is installed at a plurality of places where vehicles are driving such as parking lots and department stores. For example, a vehicle number recognizer may be installed at the entrance and exit of a parking lot and capture an entering vehicle's license plate, and then recognize it as characters and numbers to charge a parking fee.

However, types of vehicle number recognizers are very various and vehicle number recognition standards or communication standards between vehicle number recognizers are not prepared yet. Due to this, controls for different types of vehicle number recognizers are actually impossible and information recognized from vehicle number recognizers cannot be utilized.

Recently, researches for utilizing information recognized from vehicle number recognizers by controlling different types of vehicle number recognizers in an integrated manner are continuously under developments.

SUMMARY OF THE INVENTION

The present invention provides a vehicle service providing device for increasing user convenience and providing a variety of information to a user by managing a vehicle number recognizer using different vehicle number recognizing methods in an integrated manner.

According to an aspect of the present invention, provided is a vehicle service providing device for controlling a first client that controls a first vehicle number recognizer using a first vehicle number recognizing method and a second client that controls a second vehicle number recognizer using a second vehicle number recognizing method. The vehicle service providing device includes: a message acquisition unit configured to obtain a message transmitted/received between an operating system (OS) of the first client and a control program of the first client wherein the message is generated from the OS or the control program according to an event occurring from the first client and transmitted/received between a message queue of the OS and a message queue of the control program; and an information extraction unit configured to analyze the message based on information on a structure of the message and extract information on a target vehicle recognized by the first vehicle number recognizer from the analyzed message, wherein the structure of the message is different from a structure of a message transmitted/received between an OS of the second client and a control program of the second client.

The information on the target vehicle may include at least one of information on a vehicle number of the target vehicle, information on a time at which the target vehicle is recognized, or a service fee charged to the target vehicle.

The vehicle service providing device may further include a memory data acquisition unit configured to obtain memory data stored in a memory by scanning the memory allocated to the control program of the first client, wherein the information extraction unit analyses the memory data by using information on a structure of the memory data obtained by the memory data acquisition unit and extracts information on the target vehicle from the analyzed memory data; and the structure of the memory data is different from a structure of memory data stored in a memory allocated to the control program of the second client.

The structures of the message and the memory data may include an identifier and an identifier value corresponding to the identifier; and each of the identifier value represents different information on the target vehicle.

The information extraction unit may check a type of information that each of the identifier value represents based on mapping information pre-obtained from the first client; and extract information on the target vehicle from the message or the memory data based on the checked type of the information.

The information extraction unit may map information that each of the identifier value represents into a predetermined data table based on the checked type of the information to generate result data including information on the extracted target vehicle.

The vehicle service providing device may further include a client control unit configured to generate a control message for controlling the first client and insert the control message into a message queue of the OS or a message queue of the control program.

The client control unit may generate a control message for controlling at least one of the first client, the first vehicle number recognizer, and a peripheral device that the first client controls.

The peripheral device may include a gate where the target vehicle passes, and when the service fee is charged to a user of the target vehicle, the client control unit may generate a control message for controlling the gate.

According to another aspect of the present invention, provided is a client control device for controlling a first client that controls a first vehicle number recognizer using a first vehicle number recognizing method and a second client that controls a second vehicle number recognizer using a second vehicle number recognizing method. The client control device includes: a message acquisition unit configured to obtain a message transmitted/received between an operating system (OS) of the first client and a control program of the first client wherein the message is generated from the OS or the control program according to an event occurring from the first client and transmitted/received between a message queue of the OS and a message queue of the control program; a memory data acquisition unit configured to obtain memory data stored in a memory by scanning the memory allocated to the control program of the first client; a vehicle information transmission/reception unit configured to transmit the message and the memory data to a vehicle information analysis device to be used for analyzing information on a target vehicle recognized by the first vehicle number recognizer; and a client control unit configured generate a control message for controlling the first client and insert the control message into a message queue of the OS or a message queue of the control program.

According to a further aspect of the present invention, provided is a vehicle information analysis device for controlling a first client that controls a first vehicle number recognizer using a first vehicle number recognizing method and a second client that controls a second vehicle number recognizer using a second vehicle number recognizing method. The vehicle information analysis device includes: an information reception unit configured to obtain a message transmitted/received between an operating system (OS) of the first client and a control program of the first client from a client control device for controlling the first client and the second client wherein the message is generated from the OS or the control program according to an event occurring from the first client and transmitted/received between a message queue of the OS and a message queue of the control program; and a vehicle information extraction unit configured to analyze the message by using information on a structure of the message, analyze the memory data by using information on a structure of the memory data, and extract information on a target vehicle recognized by the first vehicle number recognizer from the analyzed message and the analyzed memory data; and a vehicle information transmission unit configured to transmit information on the extracted target vehicle to the client device.

According to a still further aspect of the present invention, provided is a vehicle service providing method for controlling a first client that controls a first vehicle number recognizer using a first vehicle number recognizing method and a second client that controls a second vehicle number recognizer using a second vehicle number recognizing method. The method includes: obtaining a message transmitted/received between an operating system (OS) of the first client and a control program of the first client wherein the message is generated from the OS or the control program according to an event occurring from the first client and transmitted/received between a message queue of the OS and a message queue of the control program; and analyzing the message based on information on a structure of the message and extracting information on a target vehicle recognized by the first vehicle number recognizer from the analyzed message, wherein the structure of the message is different from a structure of a message transmitted/received between an OS of the second client and a control program of the second client.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
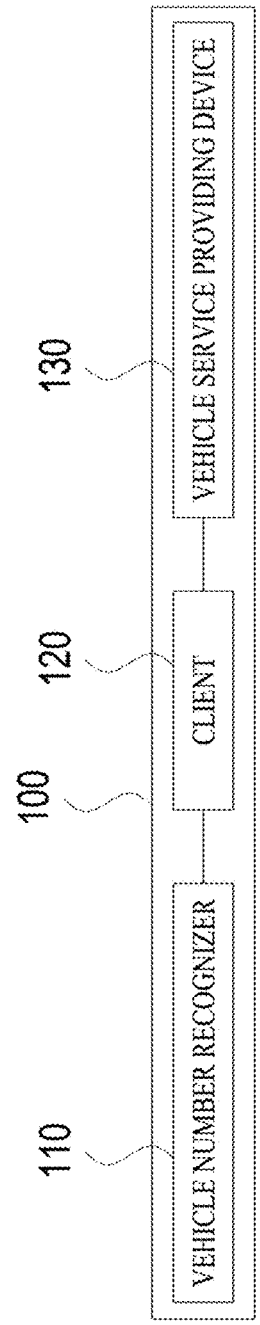
FIG. 1 is a view illustrating a vehicle service providing system according to an embodiment of the present invention.

Hereinafter, embodiments are described in detail with reference to the accompanying drawings. However, the present invention is not limited or restricted to embodiments. Additionally, like reference numerals in each drawing represent like elements.

FIG. 1 is a view illustrating a vehicle service providing system according to an embodiment of the present invention.

Referring to FIG. 1, a vehicle service providing system 100 may include a vehicle number recognizer 110, a client 120, and a vehicle service providing device 130.

The vehicle number recognizer 110 may represent a device for recognizing a vehicle's number. As one example, the vehicle number recognizer 110 may be expressed as a Licensing Plate Recognition (LPR) device. According to an embodiment of the present invention, the vehicle number recognizer 110 and the client 120 may extract a vehicle number in an optical manner. In this case, the vehicle number recognizer 110 may include a camera (for example, a CCD camera) and a processor. For example, the vehicle number recognizer 110 may capture a vehicle's license plate through an image sensor of the camera and the processor may extract a vehicle number from the captured image. As one example, the processor may read the vehicle number by using an Optical Character Reader (OCR) technique. Additionally, the vehicle number recognizer 110 may be installed at all places where vehicle numbers are to be recognized. For example, the vehicle number recognizer 110 may be installed at the entrances of parking lots, toll roads, and so on.

The client 120 may represent a device for controlling the vehicle number recognizer 110. The client 120 may receive information on a vehicle number, which is recognized by the vehicle number recognizer 110, from the vehicle number recognizer 110, and generate and process information on the recognized vehicle. For example, the client 120 may detect a time point for receiving information on a vehicle number recognized by the vehicle number recognizer 110, and calculate a service fee on the vehicle by using the information on the vehicle number received from the vehicle number recognizer 110 and the time point for receiving the vehicle number. Although it is expressed that the vehicle number recognizer 100 and the client 120 are separated in the example of FIG. 1, the vehicle number recognizer 100 and the client 120 may be implemented as one device. In this case, the client 120 may extract a vehicle number from an image captured by the vehicle number recognizer 110 as performing a role of the processor in the vehicle number recognizer 110, and generate and process information on the recognized vehicle.

The vehicle service providing device 130 may provide service to a user of a vehicle recognized by the vehicle number recognizer 110 as controlling the client 120. In this case, the vehicle service providing device 130 may control the client 120 regardless of the type of the client 120. For example, the vehicle service providing device 130 may control a vehicle number recognizer using a different vehicle number recognizing method than the vehicle number recognizer 110 and another client for controlling the same in addition to the client 120. Hereinafter, "a vehicle number recognizing method is different" may include that a structure of data transmitted/received between the vehicle number recognizer 110 and the client 120, a program running on the vehicle number recognizer 110, or a program running on the client 120 is different in addition to that a vehicle number recognizing method is different. Accordingly, the vehicle service providing device 130 may obtain information on a vehicle regardless of the type of the vehicle number recognizer 110 or the client 120 as controlling all clients integrally and provide service to a user by using the extracted information.

Hereinafter, obtaining vehicle information and providing service by using the obtained information are described in detail.

<Acquisition of Vehicle Information>

Figure 2:
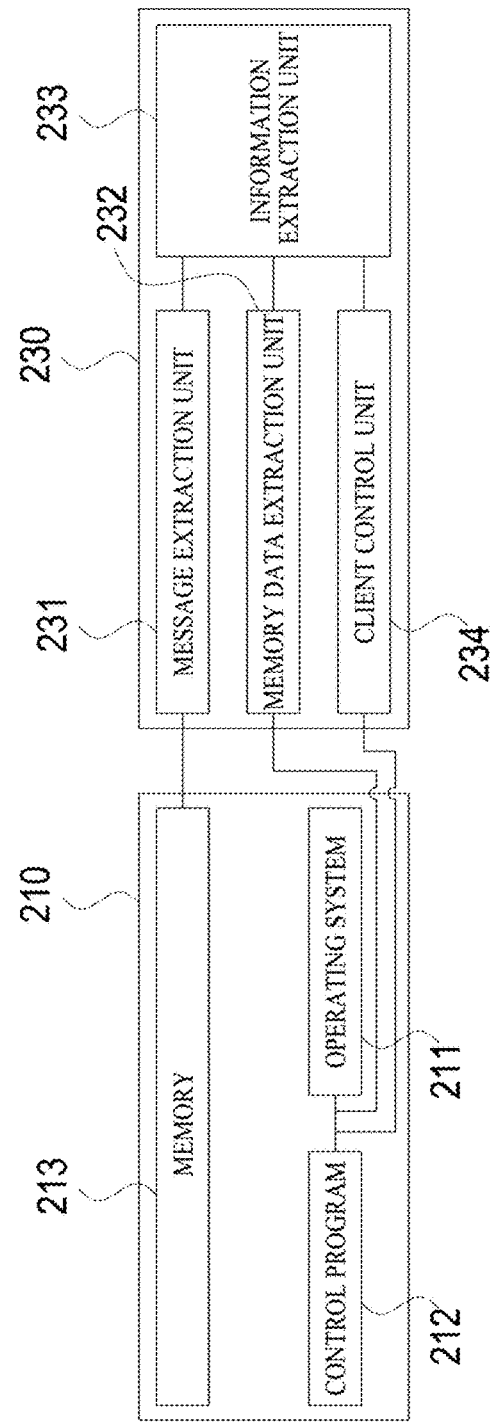
FIG. 2 is a block diagram illustrating a client and a vehicle service providing device according to an embodiment of the present invention.

FIG. 2 is a block diagram illustrating a client and a vehicle service providing device according to an embodiment of the present invention.

Referring to FIG. 2, a client 210 may include an operating system 211, a control program 212, and a memory 213. Herein, the operating system 211 may control all the hardware and software of the client 210, performs an interface role between the hardware and application program of the client 210, and manage a resource of the client 210. The control program 212 may control a vehicle number recognizer, receive information a vehicle number recognized by the vehicle number recognizer, generate or process information on a vehicle based on the received information, and run under the management of the operating system 211. The operating system 211 and the control program 212 may operate as storing data in the memory 213. For example, the control program 212 may store data in an arbitrary area allocated on the memory 213.

According to an embodiment of the present invention, each of the operating system 211 and the control program 212 may include a message queue. The message queue may operate in a First In First Out (FIFO) structure and store an arbitrary message, and a message may be executed on the operating system 211 or the control program 212 according to the order in which the message is stored in the message queue. Herein, the message may be generated according to an event generated by the client 210. A message generated by the operating system 211 may be stored in the message queue of the operating system 211 and may be transmitted to the message queue of the control program 212 according to the stored order. Additionally, a message generated by the control system 212 may be stored in the message queue of the control system 211 and may be transmitted to the message queue of the operating system 212 according to the stored order. For example, when an event such as a button selection by a user of the client 210 occurs, the operating system 211 may generate a message corresponding to a corresponding event and transmit the generated message to the control program 212. Additionally, when generating an output event to be displayed on the screen of the client 210, the control program 212 may generate an output message including at least one of information on a vehicle number of a target vehicle recognized by a vehicle number recognizer, information on a time at which the target vehicle is recognized, or information on a service fee charged to the target vehicle, and transmit it to the operating system 211. Additionally, the operating system 211 and the control program 212 may store a message, which is stored in a message queue, in an area allocated to the operating system 211 and the control program 212 on the memory 213. Hereinafter, data stored in a memory area allocated to the operating system 211 and the control program 212 may be defined as memory data. In the above example, the control program 212 may store an output message in a memory area allocated to the control program 212.

The vehicle service providing device 230 may obtain information on a vehicle recognized by a vehicle number recognizer, from the client 210. At this point, the vehicle service providing device 230 may obtain information on a vehicle recognized by a vehicle number recognizer, from the client 210, regardless of the type of the client 210 or the type of the vehicle number recognizer. As one example, the vehicle service providing device 230 may control the client 210 for controlling a vehicle number recognizer using a first vehicle number recognizing method and another client for controlling a vehicle number recognizer using a second vehicle number recognizing method different from the first vehicle number recognizing method, and obtain information on vehicles from the client 210 and the other client.

Referring to FIG. 230, the vehicle service providing device 230 may include a message extraction unit 231, a memory data extraction unit 232, an information extraction unit 223, and a client control unit 234.

The message extraction unit 231 may obtain messages transmitted/received between the operating system 211 and the control program 212 of the client 210. According to an embodiment of the present invention, the message extraction unit 231 may obtain an authority for monitoring, deleting, adding, and processing a message transmitted/received between the operating system 211 in advance and the control program 212 of the client 210, and obtain a message from the client 210 according to the obtained authority. According to another embodiment of the present invention, a message program for monitoring, deleting, adding, and processing a message between the operating system 211 and the control program 212 may be installed on the client 210, and the message extraction unit 231 may obtain a message from the client 210 through the message program. As one example, the message extraction unit 231 may install a message program on the client 210 as transmitting the message program to the client 210, and the client 210 may receive a message program from a device other than the vehicle service providing device 230 and install the received message program thereon.

Additionally, the memory data extraction unit 232 may obtain memory data stored in a memory as scanning the memory allocated to the control program 212 of the client 210. According to an embodiment of the present invention, the memory data extraction unit 232 may obtain an authority for scanning the memory 213 in advance, and obtain memory data by scanning the memory 231 according to the obtained authority. According to another embodiment of the present invention, a scan program for scanning the memory 213 may be installed on the client 210, and the memory data extraction unit 232 may obtain memory data from the memory 213 through the scan program.

The information extraction unit 233 may extract information on a target vehicle recognized by a vehicle number recognizer that the client 210 controls by using at least one of a message extracted by the message extraction unit 231 or message data extracted by the memory data extraction unit 232. Herein, information on a target vehicle may include at least one of information on the vehicle number of the target vehicle, information on a time at which the target vehicle is recognized, or information on a service fee charged to the target vehicle. Additionally, the present invention is not limited thereto, and the information on the target vehicle may include all information on the target vehicle, which is generated or processed by the client 210.

According to an embodiment of the present invention, the information extraction unit 233 may analyze a message based on information on a message structure, and extract information on a target vehicle from the analyzed message. The message structure may include an identifier and an identifier value corresponding to the identifier. At this point, each identifier value may include different information on a target vehicle. For example, an identifier value corresponding to an identifier 1 is a vehicle number, and an identifier value corresponding to an identifier 2 is a time point at which the vehicle number of a target vehicle is recognized. The control program 212 may arbitrarily set the type of an identifier value corresponding to an identifier. Accordingly, when a client is different, that is, a control program different from that of the client 210 is used or a vehicle number recognizing method different from that of the client 210 is used, a message structure may be changed, and thus, the type of an identifier value corresponding to an identifier may be changed. For example, in relating to a message extracted from a client different from the client 210, unlike the above example, an identifier value corresponding to an identifier 1 may be a service fee of a target vehicle and an identifier value corresponding to an identifier 2 may be null.

According to an embodiment of the present invention, the information extraction unit 233 may check the type of information that each identifier value in a message represents by using message mapping information pre-obtained from the client 210, and extract information on a target vehicle from the message based on the type of the checked information. Herein, the message mapping information may include information on what kind of information each identifier value in a message represents. In the above example, the message mapping information may include information that an identifier value corresponding to an identifier 1 represents a vehicle number, and information that an identifier value corresponding to an identifier 2 represents a time point at which the vehicle number of a target vehicle is recognized. As one example, the information extraction unit 233 may generate message mapping information by obtaining a message in advance from the client 200 and analyzing the message, and receive message mapping information from the client 200.

According to an embodiment of the present invention, the information extraction unit 233 may analyze memory data based on information on a memory data structure, and extract information on a target vehicle from the analyzed memory data. The memory data structure may include an identifier and an identifier value corresponding to the identifier. At this point, like the identifier value of a message, each identifier value may include different information on a target vehicle. Additionally, the control program 212 may arbitrarily set the type of an identifier value corresponding to an identifier. Accordingly, when a client is different, that is, a control program different from that of the client 210 is used or a vehicle number recognizing method different from that of the client 210 is used, a memory data structure may be changed, and thus, the type of an identifier value corresponding to an identifier may be changed.

According to an embodiment of the present invention, the information extraction unit 233 may check the type of information that each identifier value in memory data represents by using memory data mapping information pre-obtained from the client 210, and extract information on a target vehicle from the memory data based on the type of the checked information. Herein, the memory data mapping information may include information on what kind of information each identifier value in memory data represents. As one example, the information extraction unit 233 may generate memory data mapping information by obtaining memory data in advance from the client 200 and analyzing the memory data, and receive memory data mapping information from the client 200. Accordingly, as extracting information on a vehicle recognized by a vehicle number recognizer from a message transmitted/received between the operating system 211 and the control program 212 or memory data stored in a memory allocated to the control program 212, the information extraction unit 233 may obtain information on the vehicle by integrally controlling all clients regardless of the type of the client 210 or the type of the vehicle number recognizer.

According to an embodiment of the present invention, the information extraction unit 233 may map information that each identifier value represents to a predetermined data table by using message mapping information or information that each identifier value in a message or memory data represents, which is checked based on memory mapping information, and generate result data including information on the extracted target vehicle. The information extraction unit 233 may manage information on a target vehicle based on the generated result data, and also transmit result data to an external device.

The client control unit 234 may control the client 210 by using a message. According to an embodiment of the present invention, the client control unit 234 may generate a control message for controlling at least one of the control unit 234, the client 210, a vehicle number recognizer controlled by the client 210, and a peripheral device controlled by the client 210. For example, when obtaining information that a service fee charged to a target vehicle is charged to a user of the target vehicle, the client control unit 234 may generate a control message for controlling a gate that the target vehicle in a peripheral device that the client 210 controls passes.

Additionally, the client control unit 234 may insert a control message into a message queue of the operating system 211 or a message queue of the control program 212. According to an embodiment of the present invention, the client control unit 234 may obtain an authority for inserting a message from the client 210 in advance, and insert a control message into a message queue of the operating system 211 or a message queue of the control program 212 according to the obtained authority. According to another embodiment of the present invention, a message insertion program for inserting a message into a message queue of the operating system 211 or a message queue of the control program 212 may be installed on the client 210, and the client control unit 234 may obtain a control message through the message insertion program. As one example, the client control unit 234 may transmit a message program to the client 210 and install a message insertion program on the client 210, and the client 210 may receive a message insertion program from a device other than the vehicle service providing device 230 and install the received message insertion program.

Figure 3:
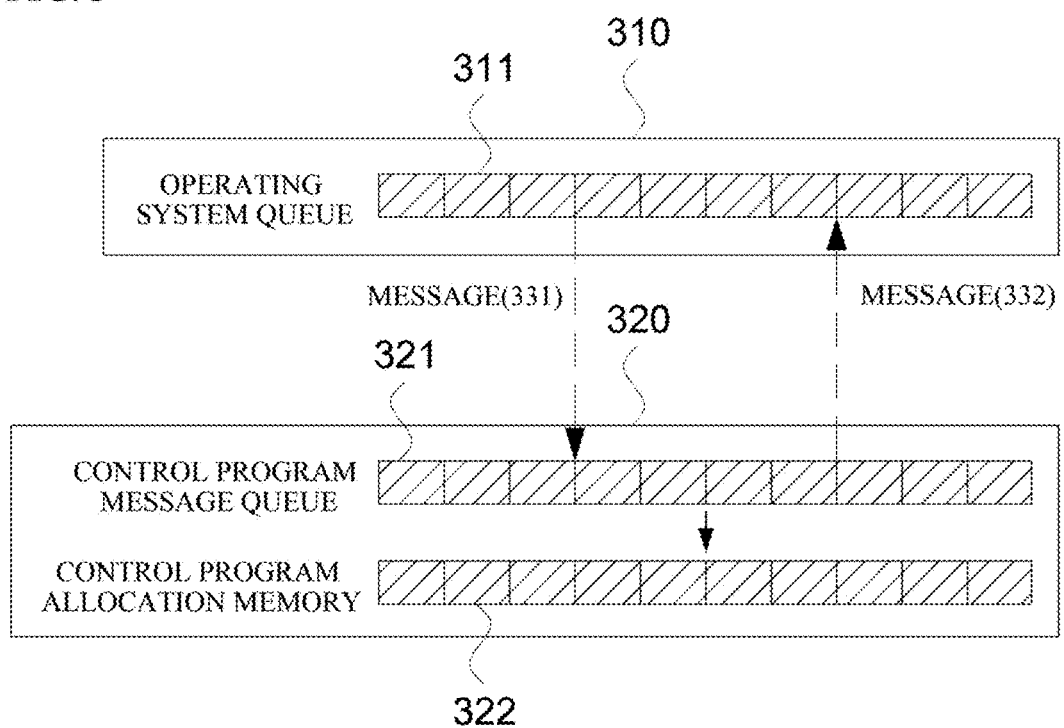
FIG. 3 is a view illustrating a message queue and a memory according to an embodiment of the present invention.

FIG. 3 is a view illustrating a message queue and a memory according to an embodiment of the present invention.

Referring to FIG. 3, an operating system 310 may include a message queue 311 and a control program 320 may include a message queue 321. The message queue 311 and the message queue 321 may operate in a FIFO structure and store a message generated according to an event generated from a client, and the stored message may be executed on the operating system 310 or the control program 320 according to the order in which the message is stored. Additionally, the control program 320 may store data in an area 322 allocated on a memory.

For example, when a user of a client clicks a mouse, a mouse click event occurs, so that the operating system 211 may generate a message 331 corresponding to the mouse click event and transmit the generated message 331 to the message queue 321. The control program 320 may execute the message 331 stored in the message queue 321, and store the message 331 as memory data in the allocated memory 322. As another example, when generating an output event for displaying information on the screen of a client, the control program 320 may generate an output message 332 including information on a vehicle, and transmit the output message 332 to the message queue 311 of the operating system 310. The operating system 310 may display a screen defined according to the output message 332 stored in the message queue 311.

A vehicle service providing device for controlling a client may obtain a message (for example, the message 331 or 332) transmitted/received between the message queue 311 of the operating system 310 and the message queue 321 of the control program 320, and extract information on a vehicle recognized by a vehicle number analyzer that a client controls by analyzing the obtained message.

Additionally, a vehicle service providing device may obtain memory data stored in the memory 322 by scanning the memory 322, and analyze the obtained memory data to extract information on a vehicle recognized by a vehicle number analyzer that a client controls.

Figure 4:
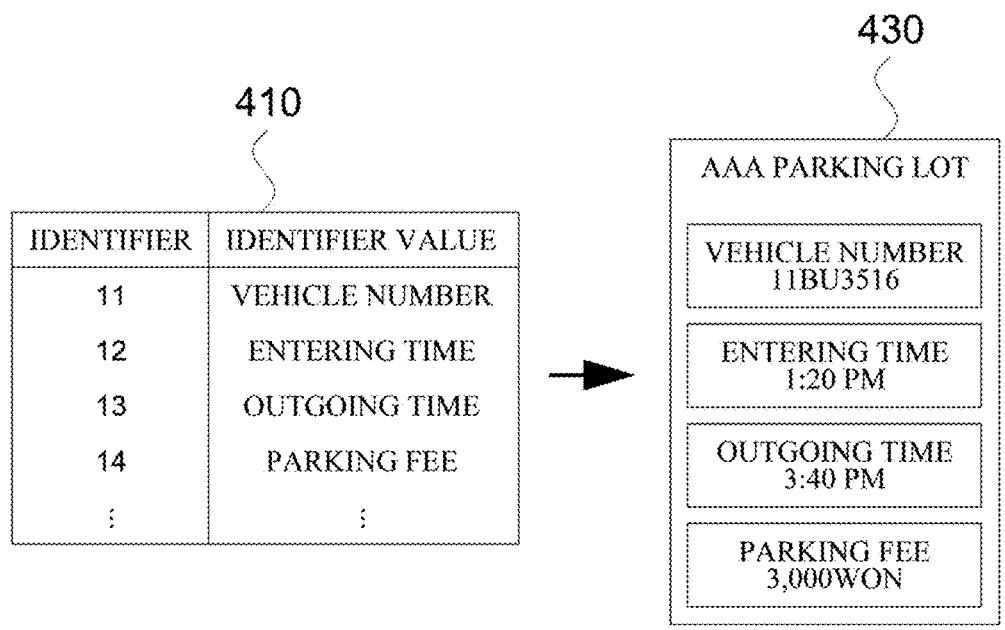
FIG. 4 is a view illustrating a memory data structure according to an embodiment of the present invention and a display outputted from a client according thereto.

FIG. 4 is a view illustrating a memory data structure according to an embodiment of the present invention and a display outputted from a client according thereto.

Referring to FIG. 4, a table 410 represents a structure of memory data stored in a memory allocated to a control program of a client. In the example of FIG. 4, memory data may be an output message that a control program generates in order to display it on the screen of a client, which is stored in a memory. In the table 410, an identifier value of an identifier 11 may represent the vehicle number of a target vehicle recognized by a vehicle number recognizer; an identifier value of an identifier 12 may represent the entering time of a target vehicle; and an identifier value of an identifier 13 may represent the outgoing time of a target vehicle; and an identifier value of an identifier 14 may represent a parking fee of a target vehicle. The control program may display a screen 430 defined by memory data.

Figure 5:
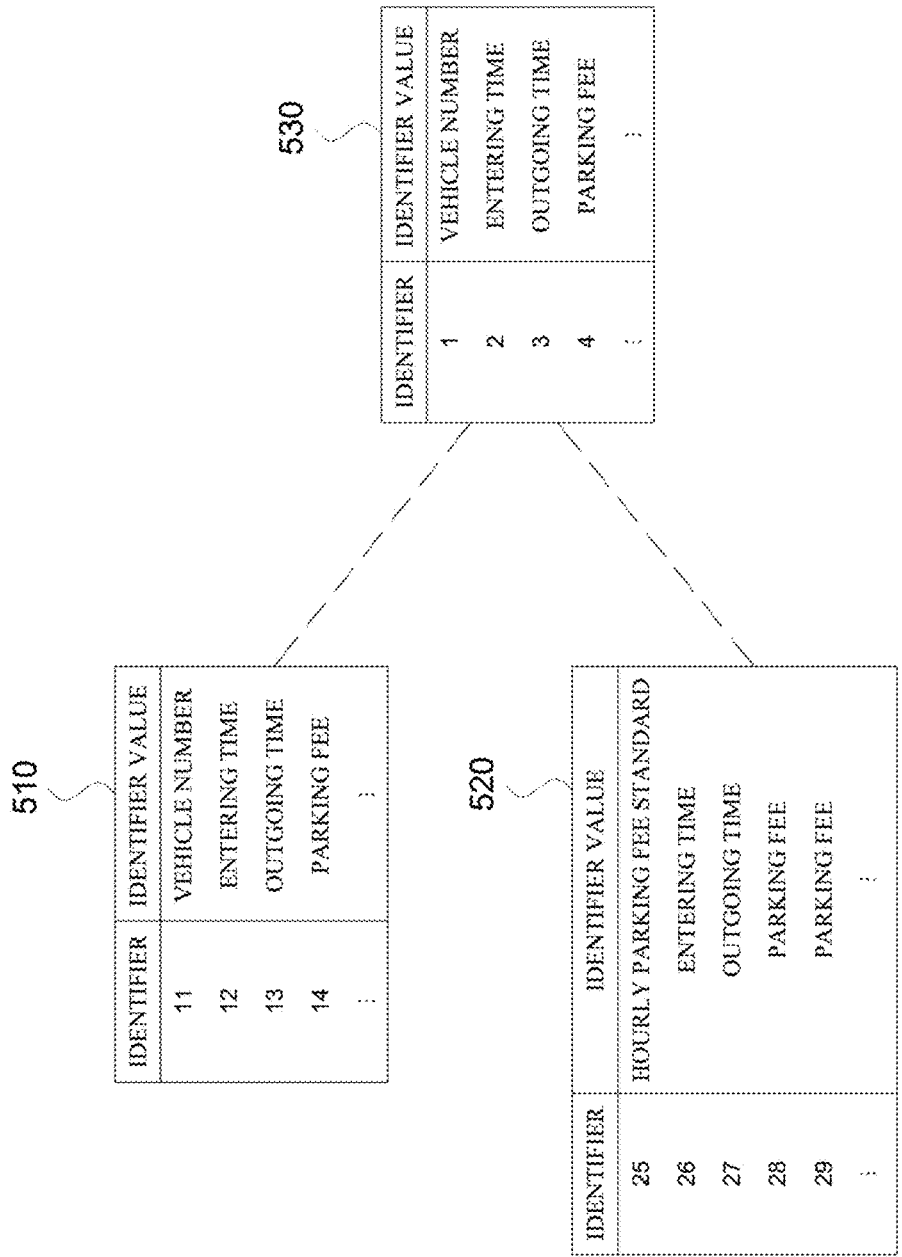
FIG. 5 is a view illustrating matching of an identifier value in a memory or memory data of different clients according to an embodiment of the present invention.

FIG. 5 is a view illustrating matching of an identifier value in a memory or memory data of different clients according to an embodiment of the present invention.

Referring to FIG. 5, a table 510 may represent a structure of a message transmitted/received between the operating system and the control program of a first client or memory data stored in an allocation memory of the control program of the first client, and a table 520 may represent a structure of a message transmitted/received between the operating system and the control program of a second client or memory data stored in an allocation memory of the control program of the second client.

In the table 510, an identifier value of an identifier 11 may represent a parking fee of a first target vehicle recognized by a vehicle number recognizer that a first client controls; an identifier value of an identifier 12 may represent the entering time of a first target vehicle; an identifier value of an identifier 13 may represent the outgoing time of a first target vehicle; and an identifier value of an identifier 14 may represent the vehicle number of a first target vehicle. On the other hand, in the table 520, an identifier value of an identifier 25 may represent the hourly parking fee standard of a second target vehicle recognized by a vehicle number recognizer that a second client controls; an identifier value of an identifier 26 may represent the entering time of a second target vehicle; an identifier value of an identifier 27 may represent the outgoing time of a second target vehicle; an identifier value of an identifier 28 may represent the vehicle number of a second target vehicle; and an identifier value of an identifier 29 may represent a parking fee of a second target vehicle.

A vehicle service providing device may check the type of information that each identifier value in the table 510 and the table 520 represents by using the pre-obtained mapping information. Additionally, a vehicle service providing device may map information that each identifier value represents to a predetermined data table based on the type of information that each identifier value in the table 510 and the table 520 represents so as to generate a result table 530. A vehicle service providing device may manage information on the first target vehicle and the second target vehicle on the basis of the result table 530.

Figure 6:
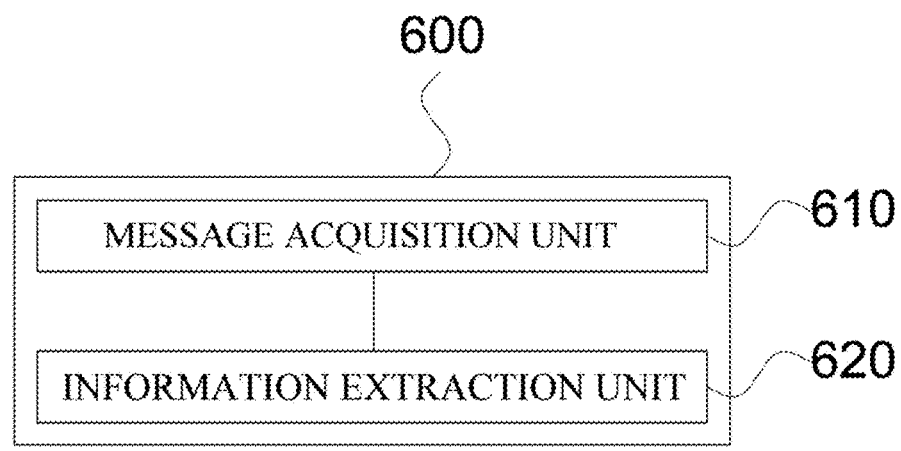
FIG. 6 is a block diagram illustrating a vehicle service providing device according to an embodiment of the present invention.

FIG. 6 is a block diagram illustrating a vehicle service providing device according to an embodiment of the present invention.

Referring to FIG. 6, a vehicle service providing device 600 may control a first client for controlling a first vehicle number recognizer using a first vehicle number recognizing method and a second client for controlling a second vehicle number recognizer using a second vehicle number recognizing method.

The vehicle service providing device 600 may include a message acquisition unit 610 and an information extraction unit 620.

The message acquisition unit 610 may obtain messages transmitted/received between the operating system of the first client and the control program of the first client. Herein, messages may be generated from an operating system or a control program according to an event generated from the first client, and may be transmitted/received between the message queue of an operating system and the message queue of a control program. Additionally, a message transmitted/received between the operating system of the first client and the control program of the first client may have a different structure than a message transmitted/received between the operating system of the second client and the control program of the second client.

The information extraction unit 620 may analyze a message based on information on a message structure, and extract information on a target vehicle recognized by the first vehicle number recognizer, from the analyzed message.

Since the contents described through FIGS. 1 to 5 are applied to the vehicle service providing device shown in FIG. 6 as they are, more detailed contents may be omitted.

Figure 7:
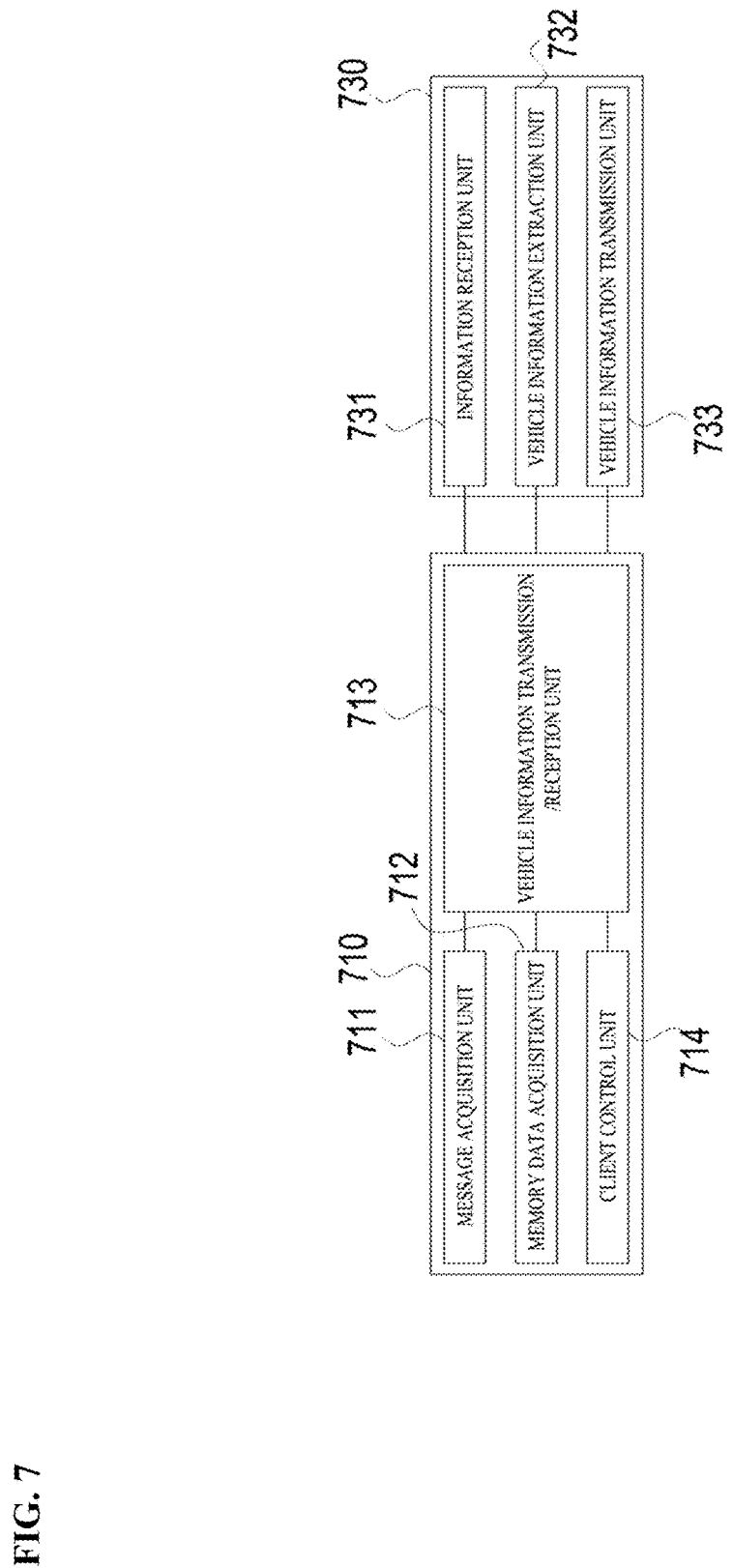
FIG. 7 is a block diagram illustrating a client control device and a vehicle information analyzing device according to an embodiment of the present invention.

FIG. 7 is a block diagram illustrating a client control device and a vehicle information analyzing device according to an embodiment of the present invention.

Referring to FIG. 7, a client control device 710 may control a first client for controlling a first vehicle number recognizer using a first vehicle number recognizing method and a second client for controlling a second vehicle number recognizer using a second vehicle number recognizing method. The client control device 710 may include a message acquisition unit 711, a memory data acquisition unit 712, a vehicle information transmission/reception unit 713, and a client control unit 714.

The message acquisition unit 711 may obtain messages transmitted/received between the operating system of the first client and the control program of the first client. Herein, messages may be generated from an operating system or a control program according to an event generated from the first client, and may be transmitted/received between the message queue of an operating system and the message queue of a control program.

The memory data acquisition unit 712 may obtain memory data stored in a memory by scanning the memory allocated to the control program of the first client.

The vehicle information transmission/reception unit 713 may transmit a message and memory data to the vehicle information analysis unit 730 to be used for analyzing a target vehicle recognized by the first vehicle number recognizer, and receive information on the target vehicle from the vehicle information analysis device 730.

The client control unit 714 may generate a control message for controlling the first client, and insert the control message into a message queue of the operating system or a message queue of the control program.

Additionally, the vehicle information analysis device 730 may analyze information generated from a first client for controlling a first vehicle number recognizer using a first vehicle number recognizing method and a second client for controlling a second vehicle number recognizer using a second vehicle number recognizing method.

The vehicle information analysis device 730 may include an information reception unit 731, a vehicle information extraction unit 732, and a vehicle information transmission unit 733.

The information reception unit 731 may receive from the client control device 710 a message transmitted/received between the operating system of the first client and the control program of the first client and memory data stored in a memory allocated to the control program of the first client. Herein, messages may be generated from an operating system or a control program according to an event generated from the first client, and may be transmitted/received between the message queue of an operating system and the message queue of a control program.

The vehicle information extraction unit 732 may analyze a message by using information on a message structure, analyze memory data by using information on a memory data structure, and extract information on a target vehicle recognized by the first vehicle number recognizer from the analyzed message and memory data.

The vehicle information transmission unit 733 may transmit the extracted information on the target vehicle to a client device.

Since the contents described through FIGS. 1 to 6 are applied to the client control device and the vehicle information analysis device shown in FIG. 7 as they are, more detailed contents may be omitted.

Figure 8:
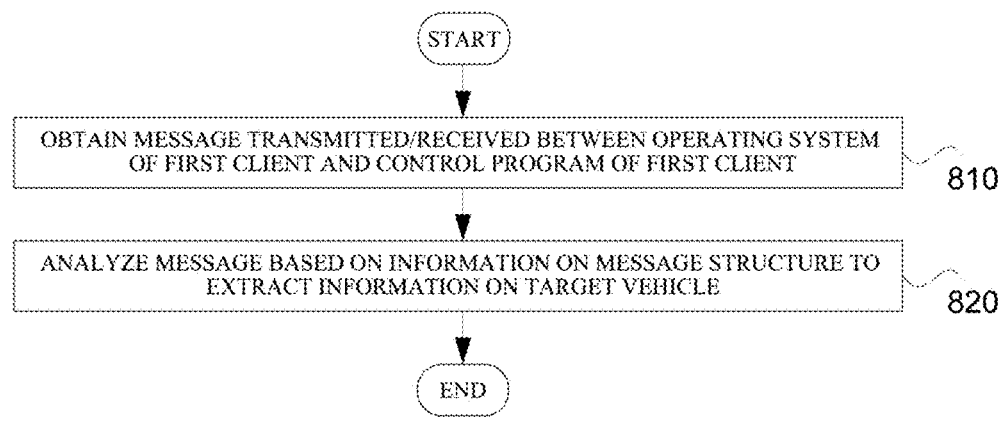
FIG. 8 is a flowchart illustrating a vehicle service providing method according to an embodiment of the present invention.

FIG. 8 is a flowchart illustrating a vehicle service providing method according to an embodiment of the present invention.

Referring to FIG. 8, a vehicle service providing method may control a first client for controlling a first vehicle number recognizer using a first vehicle number recognizing method and a second client for controlling a second vehicle number recognizer using a second vehicle number recognizing method.

A vehicle service providing device for performing the vehicle service providing method may obtain messages transmitted/received between the operating system of the first client and the control program of the first client in operation 810. Herein, messages may be generated from an operating system or a control program according to an event generated from the first client, and may be transmitted/received between the message queue of an operating system and the message queue of a control program. Additionally, a message transmitted/received between the operating system of the first client and the control program of the first client may have a different structure than a message transmitted/received between the operating system of the second client and the control program of the second client.

Additionally, the vehicle service providing device may analyze a message based on information on a message structure, and extract information on a target vehicle recognized by the first vehicle number recognizer, from the analyzed message in operation 820.

Since the contents described through FIGS. 1 to 7 are applied to the vehicle service providing method shown in FIG. 8 as they are, more detailed contents may be omitted.

<Providing Vehicle Service>

Figure 9:
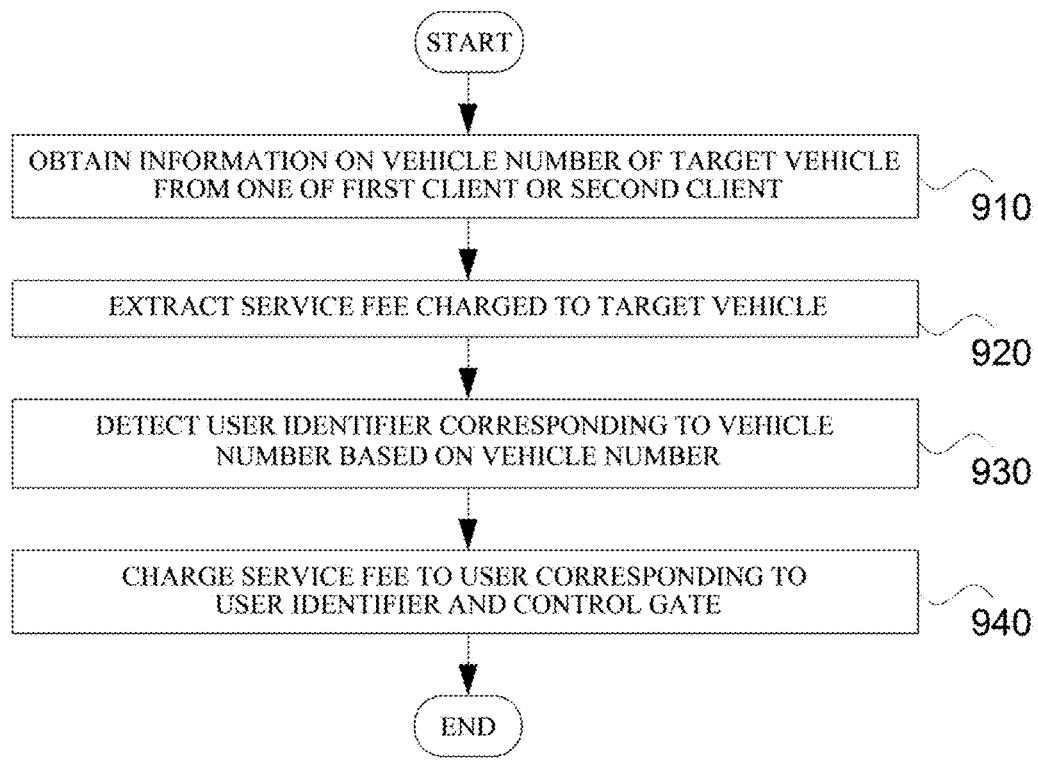
FIG. 9 is an operational flowchart illustrating a vehicle service providing method according to another embodiment of the present invention.

FIG. 9 is an operational flowchart illustrating a vehicle service providing method according to another embodiment of the present invention.

Referring to FIG. 9, a vehicle service providing device may obtain information on the vehicle number of a target vehicle from one of a first client or a second client in operation 910. Herein, the first client may control the first vehicle number recognizer and the second client may control the second vehicle number recognizer different from the first vehicle number recognizer. The first vehicle number recognizer may transmit information on a vehicle recognized by the first vehicle number recognizer to the first client, and the second vehicle number recognizer may transmit information on a vehicle recognized by the second vehicle number recognizer to the second client. Accordingly, one of the first vehicle number recognizer or the second vehicle number recognizer may transmit information on the recognized vehicle number to a client corresponding to one of the first client or the second client.

The first vehicle number recognizer and the second vehicle number recognizer may have different vehicle number recognizing methods. As mentioned above, "a vehicle number recognizing method is different" may include that a structure of data transmitted/received between the vehicle number recognizer and the client, a program running on the vehicle number recognizer, or a program running on the client is different in addition to that a vehicle number recognizing method is different. Additionally, communication may not be performed between the first client and the second client and therefore, information exchange between the first client and the second client may not occur.

The first vehicle number recognizer or the second vehicle number recognizer may be adjacent to a gate and the first vehicle number recognizer and the second vehicle number recognizer may recognize the vehicle number of a vehicle spaced a predetermined distance apart from a gate. Herein, the gate may mean a facility installed at a point where a vehicle passes, and for example, may be a switch controlled by a client. Additionally, as another example, the gate may mean the entrance where a target vehicle passes. When a target vehicle is located at a predetermined position from a gate, the first vehicle number recognizer or the second vehicle number recognizer may recognize the vehicle number of a target vehicle, and a vehicle service providing device may obtain information on the vehicle number of a vehicle from the first client or the second client. Additionally, a vehicle service providing device may also obtain another information on a target vehicle other than information on the vehicle number of the target vehicle. As one example, a vehicle service providing device may include at least one of information on the vehicle number of a target vehicle, information on a time at which the target vehicle is recognized, or information on a service fee charged to the target vehicle.

According to an embodiment of the present invention, a vehicle service providing device may receive information on a target vehicle from a first client or a second client.

According to another embodiment of the present invention, a vehicle service providing device may extract information on a target vehicle from at least one of a first message transmitted/received between the operating system and the control program of the first client, first memory data stored in a memory allocated to the control program of the first client, a second message transmitted/received between the operating system and the control program of the second client, or second memory data stored in a memory allocated to the control program of the second client. With respect to this, the contents described through FIGS. 2 to 7 may be applied as they are.

Additionally, the vehicle service providing device may extract a service fee charged to a target vehicle in operation 920. According to an embodiment of the present invention, a vehicle service providing device may extract a service fee, which is calculated by a corresponding client, from a client that recognizes the vehicle number of a target vehicle among the first client and the second client. For example, when the first vehicle number recognizer recognizes the vehicle number of a target vehicle, the first client may extract a service fee of the target vehicle based on the vehicle number of the target vehicle and a service time of the target vehicle. In this case, the control program of the first client may generate a message including information on a service fee of a target vehicle and transmit the generated message to the operating system. Additionally, the control program may store the message as memory data in a memory area allocated to the control program. The vehicle service providing device may obtain the memory or memory data of the control program, and extract information on a service fee of a target vehicle from the obtained message or memory data.

Additionally, the vehicle service providing device may calculate a service fee charged to a target vehicle. According to an embodiment of the present invention, a vehicle service providing device may calculate a service fee charged to a target vehicle based on at least one of that position of a vehicle number recognizer that recognizes the vehicle number of the target vehicle or a time point at which the vehicle number of the target vehicle is recognized. In this case, a vehicle service providing device may receive information on the position of a vehicle number recognizer from a client or an external device, and information on the position of a vehicle number recognizer may be pre-stored in a vehicle service providing device. Additionally, a vehicle service providing device may obtain a message or memory data of the control program of a client, and extract information on a time point at which the vehicle number of a target vehicle from the obtained message or memory data.

According to an embodiment of the present invention, a vehicle service providing device may calculate a service fee for a section between the first vehicle number recognizer and the second vehicle number recognizer. For example, when the vehicle number of a target vehicle is recognized by one of the first vehicle number recognizer and the second vehicle number recognizer at a first time point and the vehicle number of a target vehicle is recognized by one of the first vehicle number recognizer and the second vehicle number recognizer at a second time point after the first time point, a vehicle service providing device may extract a distance between the position of a vehicle number recognizer that recognizes the vehicle number of a target vehicle at a first time point and the position of a vehicle number recognizer that recognizes the vehicle number of a target vehicle at a second time point. Additionally, a vehicle service providing device may determine a service fee charged to a target vehicle based on the extracted distance.

According to another embodiment of the present invention, when a target vehicle is parked at a zone where the first vehicle number recognizer or the second vehicle number recognizer is installed, a vehicle service providing device may calculate a parking service fee for the target vehicle. For example, when the vehicle number of a target vehicle is recognized by one of the first vehicle number recognizer and the second vehicle number recognizer at a first time point and the vehicle number of a target vehicle is recognized by one of the first vehicle number recognizer and the second vehicle number recognizer at a second time point after the first time point, a vehicle service providing device may extract information on the first time point and the second time point. Additionally, a vehicle service providing device may determine a service fee charged to a target vehicle based on a time between the first time point and the second time point.

Additionally, when a predetermined condition is satisfied, a vehicle service providing device may adjust an extracted service fee or a calculated service fee. For example, when receiving information on vouchers (or discount coupons) from a user, a vehicle service providing device may reduce the extracted service fee or the calculated service fee based on the information on vouchers (for example, a voucher available period, a discount amount, a discount rate, and so on).

Additionally, the vehicle service providing device may extract a user identifier corresponding to a vehicle number based on the vehicle number of a target vehicle in operation 930. According to an embodiment of the present invention, information on a user of a target vehicle may be registered in a vehicle service providing device. For example, after a user of a target vehicle is registered as a member to a vehicle service, information on the user of the target vehicle may be stored in a vehicle service providing device or an integrated server for controlling a vehicle service providing device. Additionally, information on a user of a target vehicle may be pre-stored in a vehicle service providing device, and when information on a user of a target vehicle is pre-stored in an integrated server, a vehicle service providing device may receive information on a user of a target vehicle from an external server.

According to an embodiment of the present invention, information on a vehicle's user may include a user identifier and a vehicle number. At this point, in relation to one user identifier, a vehicle number may be specified in plurality but one vehicle number may correspond to only one user identifier. For example, the three vehicle numbers "11Ga1111", "11Ga1112", "11Ga1113" may be specified to a first user identifier but may not correspond to a second user identifier. This is to clearly identify a user who pays a service fee charged to a vehicle. Accordingly, the vehicle number of a target vehicle may correspond to only the user identifier of a user of a target vehicle among a plurality of user identifiers, and the user identifier of a user of a target vehicle may correspond to at least one vehicle number including the vehicle number of a target vehicle. Accordingly, a vehicle service providing device may detect a user identifier corresponding to the vehicle number of a target vehicle from information on a plurality of users.

Additionally, information on a user of a vehicle may include a user's mobile phone number. At this point, one user identifier may correspond to one mobile phone number. Additionally, payment information for paying a service fee may be specified to a user identifier. According to an embodiment of the present invention, payment information may include at least one of point payment information for paying a service fee with a point corresponding to a call, card payment information for paying a service with a card, or mobile phone payment information for paying a service fee with a mobile phone.

Additionally, the vehicle service providing device may charge a service fee to a user corresponding to the extracted user identifier, and control a gate in operation 940. According to an embodiment of the present invention, a vehicle service providing device may notify a service fee history to a user corresponding to the user identifier, and charge a service fee. For example, a vehicle service providing device may transmit a service fee history as a text message or an instant message to a user corresponding to the user identifier, and transmit a service fee history through a program that communicates with the vehicle service providing device.

Additionally, according to an embodiment of the present invention, after charging a service fee to a user corresponding to the user identifier, a vehicle service providing device may control a gate to allow a target vehicle to pass a gate before a corresponding user pays the service fee. According to an embodiment of the present invention, before requesting a payment of a service fee from a payment server for paying the service fee, a vehicle service providing device may control a gate to allow a target vehicle to pass a gate in response to the detection of the user identifier and the charging of the service fee. Accordingly, as it is possible that a user pays a service fee later, the user convenience may be increased.

According to another embodiment of the present invention, after charging a service fee to a user corresponding to the user identifier and a corresponding user pays the service fee, a vehicle service providing device may control a gate to allow a target vehicle to pass a gate in response to the authentication of payment processing. Accordingly, the vehicle service providing device may receive a service fee stably from a user.

Additionally, the vehicle service providing device may charge a service fee to a user corresponding to the user identifier, and perform the payment processing of the service fee in response to a corresponding user's request. The vehicle service providing device may request the payment of a service fee from a payment server and authenticate the payment processing of the service fee by receiving a message that the payment of the service fee is processed from the payment server. Payment information for paying a service fee corresponding to a user identifier may include at least one of point payment information, card payment information, or mobile phone payment information. As one example, when a user performs a point payment, a vehicle service providing device may inquire about a user's remaining points and when the inquired remaining points are enough for paying a service fee, the vehicle service providing device may request the payment of the service fee from a payment server and eliminate points used for the payment from the user's remaining points. As another example, when a user performs a card payment, a vehicle service providing device may request the payment of a service fee from a payment server by using a user's card number included in card payment information. As another example, when a user performs a mobile phone payment, a vehicle service providing device may request the payment of a service fee from a payment server by using a mobile phone number corresponding to the user.

According to an embodiment of the present invention, a vehicle service providing device may request the payment of a service fee from a payment server by using the vehicle number as the payment authentication key of the service fee. At this point, when a user performs a card payment, a vehicle service providing device may check whether a card number for payment matches the vehicle number of a target vehicle based on information on a user of the target vehicle. When the card number matches the vehicle number, the vehicle service providing device may request the payment of a service fee from a payment server and when the card number does not match the vehicle number, the vehicle service providing device may not request the payment of the service fee from the payment server. In the same manner, when a user uses a point payment or a mobile phone payment, a vehicle service providing device may check whether a corresponding point matches a vehicle number or whether a mobile phone number matches a vehicle number, and when they are matched, request the payment of a service fee from a payment server.

Additionally, a vehicle service providing device may transmit information on a vehicle number to a payment server so that it is used for the payment of a service fee. For example, when a user performs a card payment, a vehicle service providing device may transmit information on a vehicle number in addition to a card number. A payment server may determine whether the payment of a service fee is to be performed with a card number for payment by using a vehicle number and when it is determined that the payment of the service fee is performed, perform the payment of the service fee with the card number for payment. For example, information on a vehicle number that matches a card number may be pre-stored in a payment server; a determination may be made on whether a vehicle number received from a vehicle service providing device matches a card number for payment based on the pre-stored information; and when the vehicle number received from the vehicle service providing device matches the card number for payment, it may be determined that the payment of the service fee is performed with the card number for payment. In the same manner, when a user uses a point payment or a mobile phone payment, a vehicle service providing device may transmit information on a vehicle number in addition to point information or a mobile phone number, and a payment server may determine whether the payment of a service fee is to be performed using the information received from the vehicle service providing device.

Additionally, when two or more of point payment information, card payment information, or mobile phone payment information are specified as payment information for paying a service fee to a user identifier, a vehicle service providing server may request the payment of the service fee from a payment server by using payment information of a first priority according to a predetermined priority. For example, in the case that a priority is set in the order of a point payment, a mobile phone payment, and a card payment, when a user pays a service fee, a vehicle service providing device may request the payment of the service fee first from a payment server by using a user's point, and when the service fee is not paid with the user's remaining points, the vehicle service providing device may request the payment of the service fee from a payment server by using mobile phone information corresponding to the user. In such a way, a user may pay a service fee conveniently and accordingly, the user convenience may be increased and a time that a user passes a gate may be shortened.

When the payment of the service fee is processed in the payment server, the vehicle service providing device may receive a message that the payment of the service fee is processed from the payment server and authenticate the payment processing of the service fee in response to the message reception.

Additionally, a vehicle service providing device may generate additional information based on information on a target vehicle recognized by a vehicle number recognizer. Herein, the additional information may mean all information processed based on information on a target vehicle, and for example, may include driving pattern information of a target vehicle, traffic information, and statistical information. As one example, a vehicle service providing device may accumulate and store information such as a time point at which a target vehicle is recognized by a vehicle number recognizer, the position of a vehicle number recognizer, the number of vehicles in a vehicle number recognizer, or the vehicle number of a target vehicle, and perform big data analysis based on the stored information. A vehicle service providing device may provide the generated additional information to a user. For example, a vehicle service providing device may provide additional information to a user through a text message, an instant message, or a program communicated with the vehicle service providing device. Additionally, a vehicle service providing device may transmit the generated additional information to an external device so that it is used for the external device.

According to an embodiment of the present invention, a vehicle service providing device may analyze a driving pattern of a target vehicle. A vehicle service providing device may cumulatively obtain, from at least one of the first client or the second client, recognition time point information for representing a time point at which the vehicle number of a target vehicle is recognized by at least one of the first vehicle number recognizer or the second vehicle number recognizer, and analyze the driving pattern of the target vehicle by using information on at least one cumulatively obtained recognition time point.

According to another embodiment of the present invention, a vehicle service providing device may generate traffic information based on information on a target vehicle recognized by a vehicle number recognizer. For example, a first vehicle number recognizer may be installed at the entrance of an arbitrary road section, and the second vehicle number recognizer may be installed at the exit of a corresponding road section. In this case, the vehicle service providing device may obtain information on the number of vehicle numbers recognized by the first vehicle number recognizer from the first client for a predetermined time, and information on the number of vehicle numbers recognized by the second vehicle number recognizer from the second client for a predetermined time. A vehicle service providing device may generate traffic information on a section between the first vehicle number recognizer and the second vehicle number recognizer by using the information on the number of vehicle numbers recognized by the first vehicle number recognizer and the information on the number of vehicle numbers recognized by the second vehicle number recognizer. A vehicle service providing device may provide the generated traffic information to a user of a target vehicle. For example, when the number of vehicle numbers recognized by the first vehicle number recognizer is greater than the number of vehicle numbers recognized by the second vehicle number recognize for 1 hr, a vehicle service providing device may generate traffic information that a vehicle flow is smooth in a corresponding road section.

Additionally, a vehicle service providing device may also identify the position of a user of a target vehicle, and provide information to the user in consideration of the identified user's position. For example, when the first vehicle number recognizer is installed at a department store and recognizes the vehicle number of a target vehicle, a vehicle service providing device may obtain information on a time point at which the target vehicle is recognized and the vehicle number of the target vehicle from the first client for controlling the first vehicle number recognizer. A vehicle service providing device may recognize that a user of a target vehicle is located at a department store based on the obtained information, and provide information relating to a corresponding department store to a user. For example, a vehicle service providing device may provide information relating to a corresponding department store to a user through a text message, an instant message, or a program communicated with the vehicle service providing device.

Additionally, a vehicle service providing device may provide to an external service in real time at least one of a time point at which the vehicle number of a target vehicle is recognized, information on a user of a target vehicle, a location of a vehicle number recognizer for recognizing the vehicle number of a target vehicle, or information on a service fee, so that it is used for a service for a user of a target vehicle. For example, in the above-mentioned example, when a target vehicle is recognized by the first vehicle number recognizer installed at a department store, a vehicle service providing device may transmit, to a customer management server of the department store in real time, information on the mobile phone number of a target vehicle, a time point at which the vehicle number of a target vehicle is recognized, and a position of a vehicle number recognizer that recognizes the vehicle number of a target vehicle. Accordingly, the customer management server of the department store may query the mobile phone number of a target vehicle from a pre-stored database to identify a user of the target vehicle, and provide a parking guide service to the identified user. Additionally, the vehicle service providing device may receive information on a parking guide service from the customer management server of the department store, and provide the parking guide service to a user by using the received information.

Figure 10:
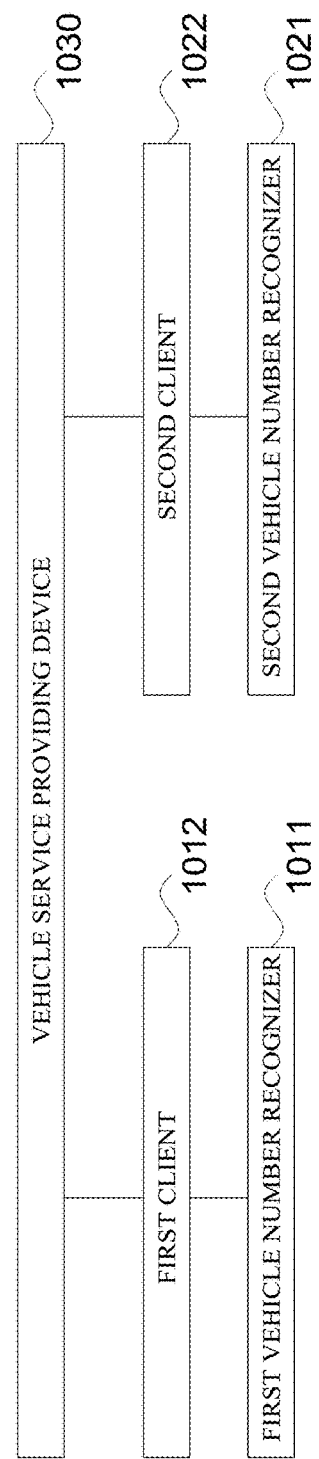
FIG. 10 and FIG. 11 are views illustrating a control of a first client and a second client according to an embodiment of the present invention.
Figure 11:
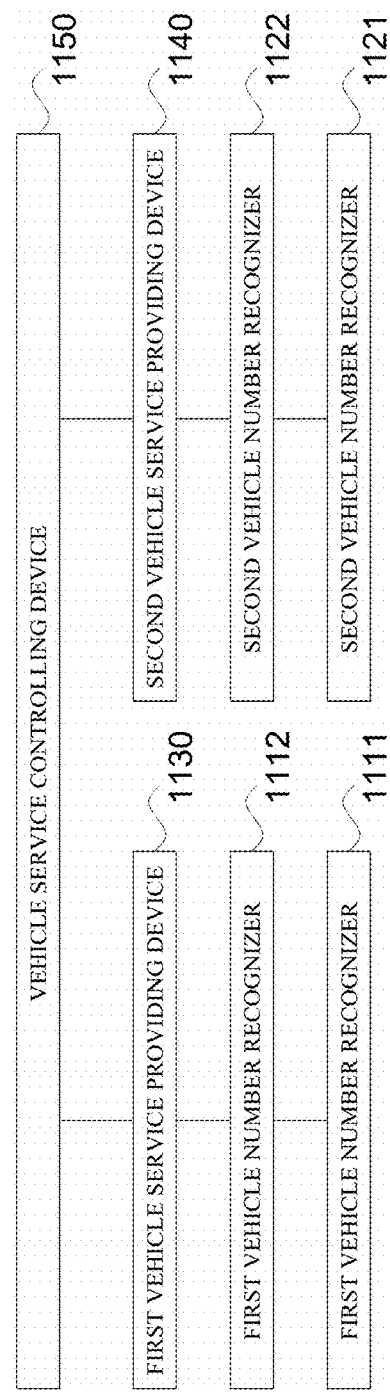

FIG. 10 and FIG. 11 are views illustrating a control of a first client and a second client according to an embodiment of the present invention.

Referring to FIG. 10, a first client 1012 may control a first vehicle number recognizer 1011 and a second client 1022 may control a second vehicle number recognizer 1021. At this point, the first vehicle number recognizer 1011 and the second vehicle number recognizer 1021 may have different vehicle number recognizing methods.

A vehicle service providing device 1030 may control the first client 1012 and the second client 1022 integrally. According to an embodiment of the present invention, the vehicle service providing device 1030 may obtain information on the vehicle number of a target vehicle recognized by one of the first vehicle number recognizer 1011 or the second vehicle number recognizer 1021 from one of the first client 1012 or the second client 1022, extract a service fee charged to the target vehicle, detect a user identifier corresponding to the vehicle number based on the vehicle number, charge the service fee to a user corresponding to the user identifier, and control a gate where the target vehicle is to pass. Herein, the vehicle service providing device 1030 may pre-store information on a user of a target vehicle in a database, and extract a user identifier from the database. Additionally, the vehicle service providing device 1030 may perform the payment of a service fee by requesting the payment of the service fee from a payment server. Additionally, the vehicle service providing device 1030 may generate additional information such as driving information of a target vehicle and traffic information based on information on the target vehicle, and provide information to a user of the target vehicle in consideration of the position of the target vehicle. Additionally, a vehicle service providing device may provide to an external service in real time at least one of a time point at which the vehicle number of a target vehicle is recognized, information on a user of a target vehicle, a location of a vehicle number recognizer for recognizing the vehicle number of a target vehicle, or information on a service fee, so that it is used for a service for a user of a target vehicle.

Referring to FIG. 11, a first client 1112 may control a first vehicle number recognizer 1111 and a second client 1122 may control a second vehicle number recognizer 1121. At this point, the first vehicle number recognizer 1111 and the second vehicle number recognizer 1121 may have different vehicle number recognizing methods.

Additionally, the first vehicle number recognizer 1130 may control the first client 1112 and the second vehicle number recognizer 1140 may control the second client 1122. A vehicle service controlling device 1150 may include a first vehicle service providing device 1130 and a second vehicle service providing device 1140 integrally.

According to an embodiment of the present invention, the first vehicle service providing device 1130 may obtain at least one of a first message transmitted/received between the operating system and the control program of the first client 1112 or first memory data stored in a memory allocated to the control program of the first client 1112, and transmit at least one of the obtained first message or first memory data to the vehicle service controlling device 1150. Additionally, the second vehicle service providing device 1140 may obtain at least one of a second message transmitted/received between the operating system and the control program of the second client 1122 or second memory data stored in a memory allocated to the control program of the second client 1122, and transmit at least one of the obtained second message or second memory data to the vehicle service controlling device 1150.

The vehicle service controlling device 1150 may extract information on a vehicle recognized by the first vehicle number recognizer 1111 based on at least one of a first message or first memory data obtained from the first vehicle service providing device 1130, and may extract information on a vehicle recognized by the second vehicle number recognizer 1121 based on at least one of a second message or second memory data obtained from the second vehicle service providing device 1140.

The vehicle service controlling device 1150 may charge a service fee to a user of a corresponding vehicle by using information on the extracted vehicle, and perform the payment of the service fee by requesting the payment of the service fee from a payment server. Additionally, the vehicle service controlling device 1150 may generate additional information based on information on the extracted vehicle, provide information to a user of a corresponding vehicle, and provide the information on the extracted vehicle to an external server in real time.

Figure 12:
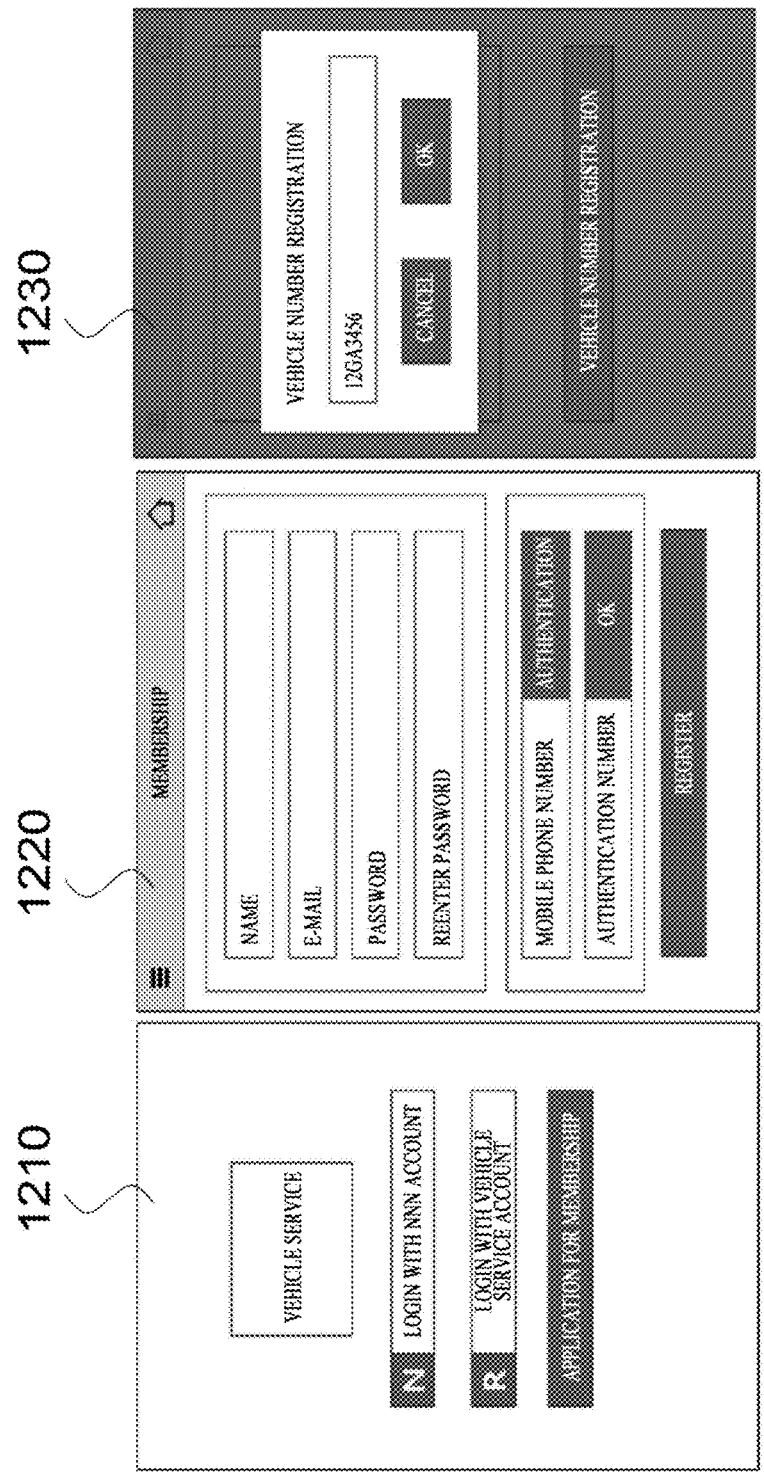
FIG. 12 is a view illustrating the registration of information on a user according to an embodiment of the present invention.

FIG. 12 is a view illustrating the registration of information on a user according to an embodiment of the present invention.

Referring to FIG. 12, a vehicle service providing device may provide a program for communicating with the vehicle service providing device to a user. The program may provide interfaces 1210 to 1230 to a user, and a user may register information on a user to a vehicle service providing device according to the provided interfaces 1210 to 1230. As one example, a user may access a vehicle service providing device according to the interface 1210. At this point, if there is no user's account in a vehicle service providing device, a user may register information on the user to create an account. In this case, the vehicle service providing device may provide the interface 1220 to a user, and according to the interface 1220, a user may register the user's name, e-mail address, password, and mobile phone information. Herein, the user's e-mail address may be a user's user identifier. Additionally, the vehicle service providing device may provide the interface 1230 to a user, and according to the interface 1230, a user may register a vehicle number. At this point, a user may register a plurality of vehicle numbers, but one vehicle number may correspond to only one user. That is, when a user registers "23Ga3456" as a vehicle number, another user may not register the vehicle number of "23Ga3456".

Figure 13:
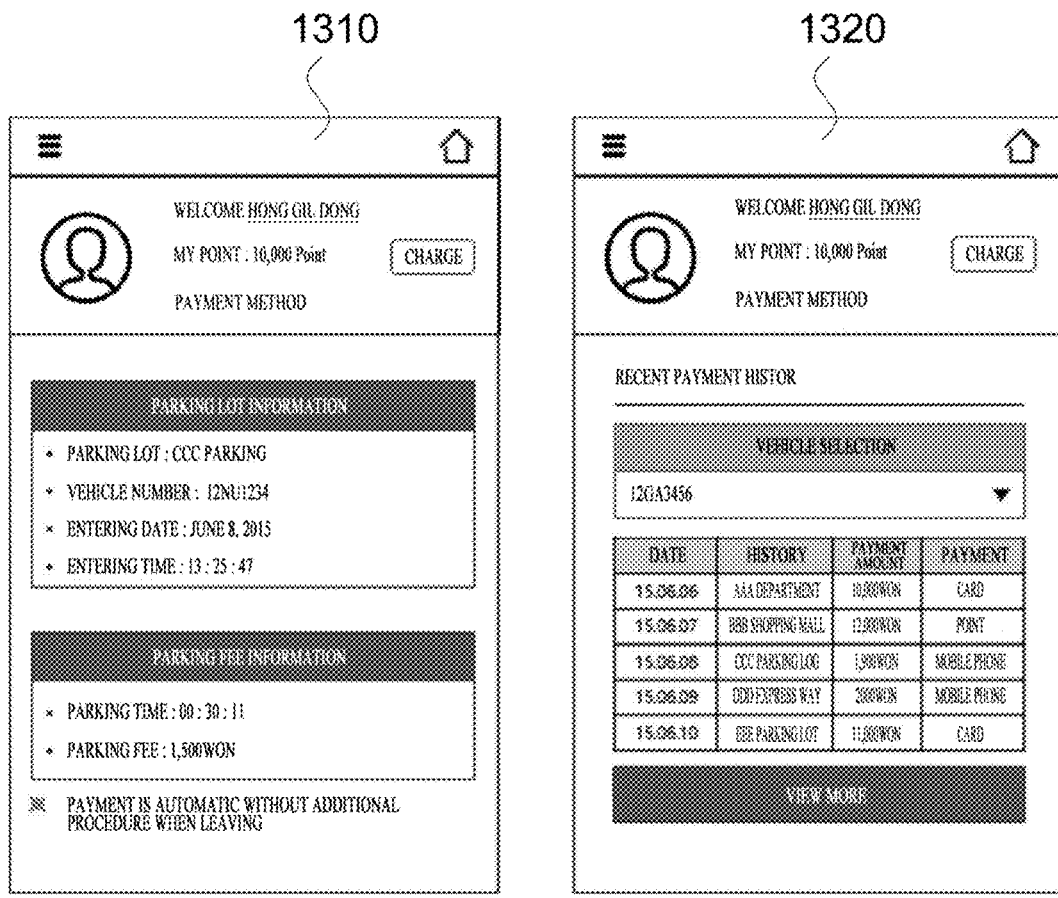
FIGS. 13 to 15 are views illustrating one example of information that a vehicle service providing device provides according to an embodiment of the present invention.
Figure 14:
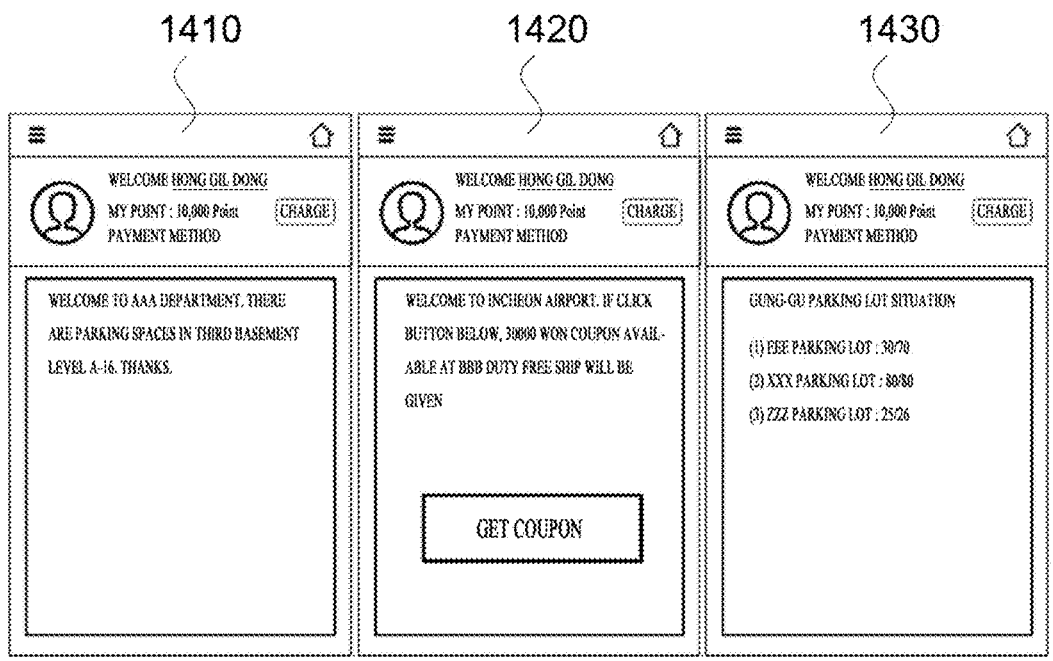
Figure 15:
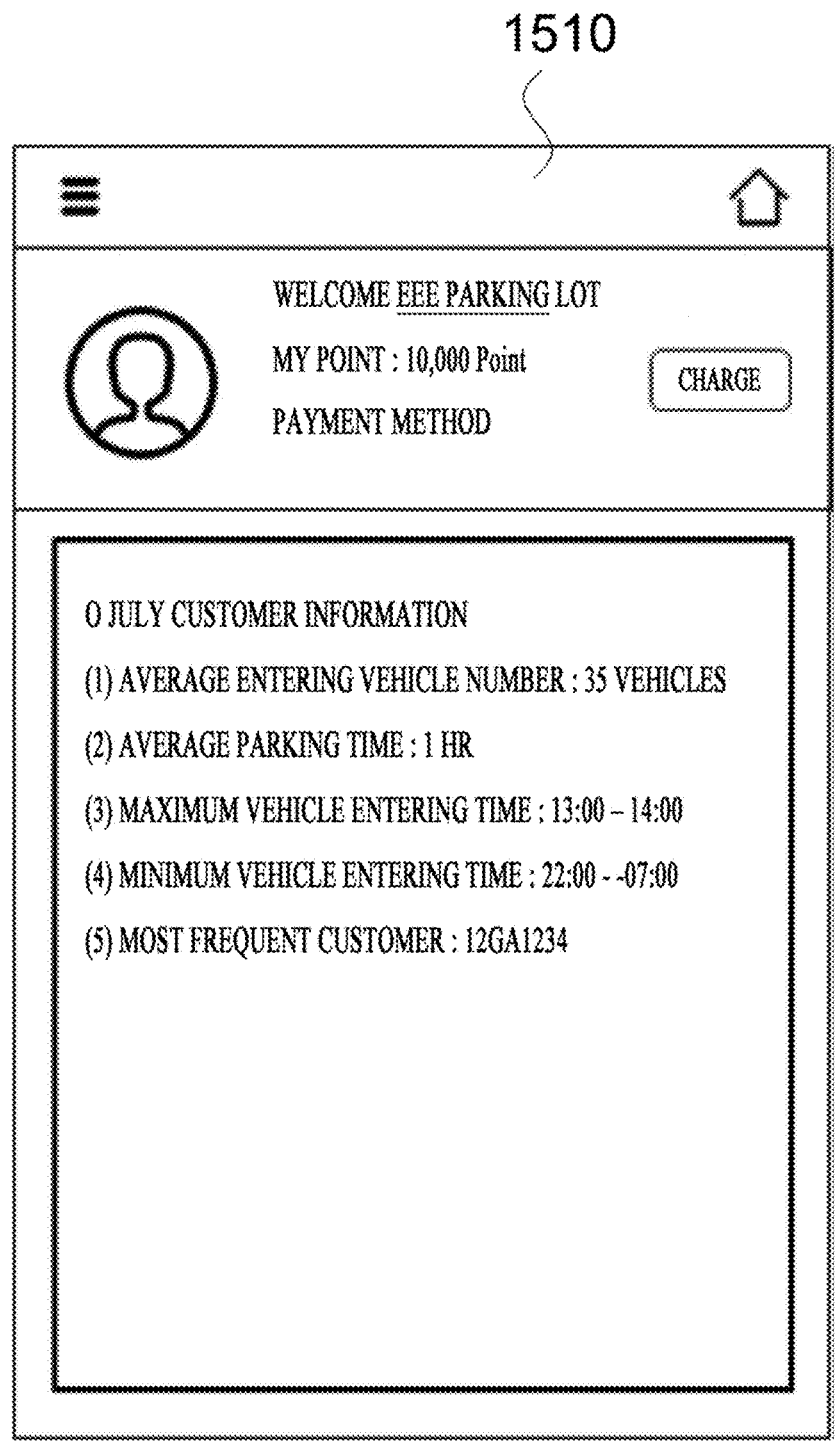

FIGS. 13 to 15 are views illustrating one example of information that a vehicle service providing device provides according to an embodiment of the present invention.

Referring to FIG. 13, a vehicle service providing device may provide information on a user vehicle's service fee, service providing place, and service providing time. When a vehicle information recognizer is installed a parking lot, a vehicle service providing device may obtain information on a user vehicle's service fee, service providing place, and service providing time, from a client for controlling the vehicle information recognizer. The vehicle service providing device may provide the obtained information to a user through an interface 1310.

Additionally, the vehicle service providing device may provide information on a payment history of a service fee to a user. According to an embodiment of the present invention, the vehicle service providing device may perform the payment of a user fee by requesting the payment of the user fee from a payment server, and store the payment history of the user fee in a database. The vehicle service providing device may extract the payment history of the service fee from the database, and provide the extracted information to a user through the interface 1320.

Referring to FIG. 14, the vehicle service providing device may identify the position of a user vehicle, and provide information to a user in consideration of the identified position. For example, when a vehicle number recognizer is installed at a department store or an airport and recognizes the vehicle number of a user vehicle, a vehicle service providing device may obtain information on a time point at which the user vehicle is recognized and the vehicle number of the user vehicle from a client for controlling the vehicle number recognizer. The vehicle service providing device may recognize that the user vehicle is located at a department store or an airport based on the obtained information, and provide information relating to a corresponding department store or airport to a user through an interface 1410 or 1420.

Additionally, the vehicle service providing device may provide information on a state of a service providing region to a user. For example, vehicle number recognizers are installed at parking lots in Jung-gu, Seoul, and a vehicle service providing device may obtain information on a vehicle recognized by a corresponding vehicle number recognizer from a client for controlling each vehicle number recognizer. The vehicle service providing device may extract information on the vehicle parking situations of parking lots where respective vehicle number recognizers are installed, based on the obtained information, and provide information on the vehicle parking situations of the parking lots to a user through the interface 1430.

Referring to FIG. 15, the vehicle service providing device may provide statistical information on a corresponding service to a service provider. For example, when a service provider provides a parking lot service to a user, a vehicle number recognizer may be installed at a corresponding parking lot. The vehicle service providing device may obtain information on a time point at which a vehicle is recognized by a vehicle number recognizer and the number of vehicles in a vehicle number recognizer, and accumulate and store the obtained information. The vehicle service providing device may extract statistical information on a parking lot service by using the accumulated information, and provide the extracted statistical information to a service provider through an interface 1510.

Figure 16:
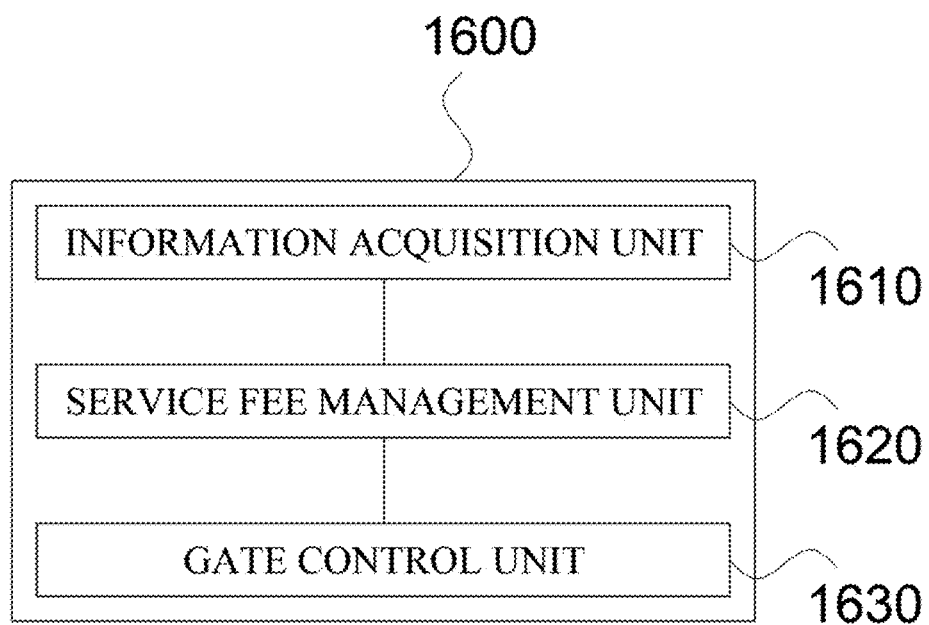
FIG. 16 is a block diagram illustrating a vehicle service providing device according to another embodiment of the present invention.

FIG. 16 is a block diagram illustrating a vehicle service providing device according to another embodiment of the present invention.

Referring to FIG. 16, a vehicle service providing device 1600 may control a first client for controlling a first vehicle number recognizer using a first vehicle number recognizing method and a second client for controlling a second vehicle number recognizer using a second vehicle number recognizing method.

An information acquisition unit 1610 may obtain information on the vehicle number of a target vehicle located at a predetermined distance from a gate, which is recognized by one of the first vehicle number recognizer or the second first vehicle number recognizer, from one of the first client or the second client. Herein, one of the first vehicle number recognizer or the second vehicle number recognizer may transmit information on the recognized vehicle number to a client corresponding to one of the first client or the second client, and may not perform communication between the first client and the second client.

A service fee management unit 1620 may extract a service fee charged to a target vehicle, query a user identifier corresponding a vehicle number from a vehicle service providing server based on the vehicle number, and charge the service fee to a user corresponding to the user identifier.

A gate control unit 1630 may control a gate according to the charging of a service fee.

Since the contents described through FIGS. 1 to 15 are applied to the vehicle service providing device shown in FIG. 16 as they are, more detailed contents may be omitted.

Figure 17:
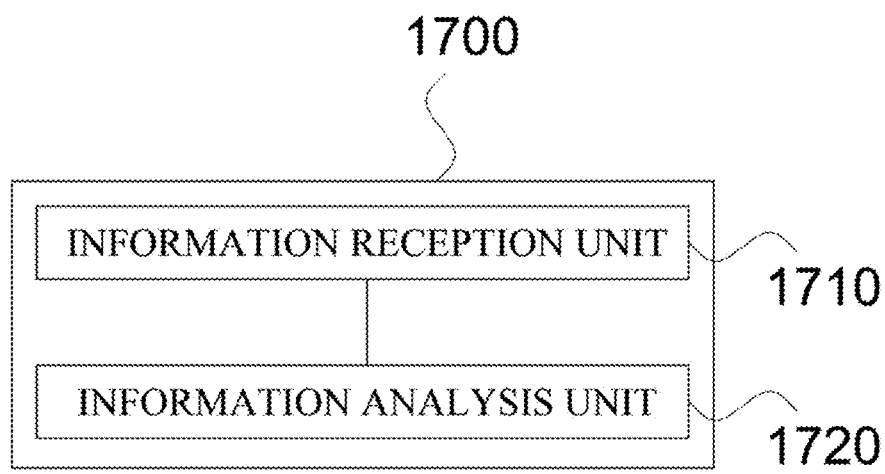
FIG. 17 is a block diagram illustrating a vehicle service providing server according to an embodiment of the present invention.

FIG. 17 is a block diagram illustrating a vehicle service providing server according to an embodiment of the present invention.

Referring to FIG. 17, an information reception unit 1710 may receive information on the vehicle numbers of a plurality of vehicles recognized by a first vehicle number recognizer or a second vehicle number recognizer, from a vehicle service providing device that controls a first client for controlling a first vehicle number recognizer using a first vehicle number recognizing method and a second client for controlling a second vehicle number recognizer using a second vehicle number recognizing method. Herein, one of the first vehicle number recognizer or the second vehicle number recognizer may transmit information on the recognized vehicle number to a client corresponding to one of the first client or the second client, and may not perform communication between the first client and the second client.

Additionally, an information analysis unit 1720 may analyze information on the vehicle driving patterns of a plurality of vehicles based on information on a place where the first vehicle number recognizer or the second vehicle number recognizer is installed, the vehicle numbers of a plurality of vehicles recognized by the first vehicle number recognizer or the second vehicle number recognizer, and a time point at which a vehicle number is recognized.

Since the contents described through FIGS. 1 to 16 are applied to the vehicle service providing server shown in FIG. 17 as they are, more detailed contents may be omitted.

A method according to an embodiment of the present invention may be implemented in a program instruction form to be performed through various computer means and may be recorded in a computer readable medium. The computer readable medium may include program instructions, data files, and data structures separately or a combination thereof. It may be understood that program instructions recorded on the medium are specially designed and configured for an embodiment or are well known to and available for those skilled in the art using computer software. Examples of the computer-readable storage media may include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction such as Read Only Memory (ROM), Random Access Memory (RAM), and flash memory. An example of a program instruction may include high-level language code executable by a computer through an interpreter in addition to machine code created by a complier. The hardware device may be configured to operate as at least one software module to perform an operation of an embodiment and vice versa.

According to the present invention, regardless of the type of a vehicle number recognizer, all vehicle number recognizers may be controlled integrally.

According to the present invention, as a user pays a service fee conveniently, the user convenience may be increased and a time that a user passes a gate may be shortened.

According to the present invention, based on a user's position, more useful information may be provided to a user.

Although the above-mentioned embodiments are described through the limited embodiments and the drawings and various modifications and transformations are possible by those skilled in the art on the basis of the above descriptions. For example, although the described techniques are performed in a different order than the described method, and/or components such as the described system, structure, device, and circuit are coupled or combined in a different form than the described method or are replaced or substituted by other components or equivalents, an appropriate result may be achieved.

Therefore, other implementations, other embodiments, and equivalents to claims belong to the scope of claims described later.

What is claimed is:

1. A vehicle service providing device for controlling a first client that controls a first vehicle number recognizer using a first vehicle number recognizing method and a second client that controls a second vehicle number recognizer using a second vehicle number recognizing method, the vehicle service providing device comprising:
    one or more processors; and
    one or more non-transitory computer-readable media including instructions which, in response to being executed by the one or more processors, cause the vehicle service providing device to perform operations comprising:
        obtaining a first message with a first structure communicated between an operating system (OS) of the first client and a control program of the first client wherein the first message is generated according to a first event occurring from the first client and communicated between a message queue of the OS of the first client and a message queue of the control program of the first client;
        obtaining a second message with a second structure communicated between an operating system (OS) of the second client and a control program of the second client wherein the second message is generated according to a second event occurring from the second client and communicated between a message queue of the OS of the second client and a message queue of the control program of the second client, wherein the first structure of the first message is different from the second structure of the second message;
        analyzing the first message based on the first structure; and the second message based on the second structure;
        identifying target vehicle information based on the first message and the second message, the target vehicle information including an identification number of a target vehicle, a first time point information, and a second time point information;
        controlling a gate corresponding to the second client based on the target vehicle information to allow the target vehicle to pass through the gate in response to a service fee being charged to a user of the target vehicle, the service fee charged to the user of the target vehicle calculated based on a time difference between the first time point and the second time point.

2. The vehicle service providing device of claim 1, the vehicle service providing device to perform operations further comprising:
    obtaining first memory data stored in a first memory by scanning the first memory allocated to the control program of the first client;
    analyzing the first memory data based on a first structure of the memory data; obtaining second memory data stored in a second memory by scanning the second memory allocated to the control program of the second client;
    analyzing the second memory data based a second structure of the second memory data, the first structure of the first memory data being different from the second structure of the second memory data; and
    identifying target vehicle information based on the first memory data and the second memory data.

3. The vehicle service providing device of claim 2, wherein the first structure of the first message and the first structure of the first memory data comprise an identifier and a identifier value corresponding to the identifier and each identifier value represents different information on the target vehicle.

4. The vehicle service providing device of claim 3, the vehicle service providing device to perform operations further comprising:
    checking a type of information that each identifier value represents based on mapping information pre-obtained from the first client; and
    identifying information on the target vehicle from the first message or the first memory data based on the checked type of the information.

5. The vehicle service providing device of claim 4, the vehicle service providing device to perform operations further comprising:
    mapping each identifier value into a predetermined data table based on the checked type of the information to generate result data including information on the identified target vehicle.

6. The vehicle service providing device of claim 2, the vehicle service providing device to perform operations further comprising:
    generating a first control message for controlling the first client; and
    inserting the first control message into the message queue of the OS of the first client or a message queue of the control program of the first client.

7. The vehicle service providing device of claim 6, wherein the first control message controls the first client, the first vehicle number recognizer, and the gate.

8. A vehicle service providing method for controlling a first client that controls a first vehicle number recognizer using a first vehicle number recognizing method and a second client that controls a second vehicle number recognizer using a second vehicle number recognizing method, the method comprising:
    obtaining a first message with a first structure communicated between an operating system (OS) of the first client and a control program of the first client wherein the first message is generated according to a first event occurring from the first client and communicated between a message queue of the OS of the first client and a message queue of the control program of the first client; obtaining a second message with a second structure communicated between an operating system (OS) of the second client and a control program of the second client wherein the second message is generated according to a second event occurring from the second client and communicated between a message queue of the OS of the second client and a message queue of the control program of the second client, wherein the first structure of the first message is different from the second structure of the second message;

analyzing the first message and the second message based on information on a first structure of the first message or the second structure of the second message; identifying target vehicle information based on the first message and the second message, the target vehicle information including an identification number of a target vehicle, a first time point information, and a second time point information; and controlling a gate corresponding to one of the first client or the second client based on the target vehicle information to allow the target vehicle to pass through the gate in response to a service fee being charged to a user of the target vehicle, the service fee charged to the user of the target vehicle calculated based on a time difference between the first time point and the second time point.

9. The vehicle service providing device of claim 1, wherein the first client is different from the second client.

10. The vehicle service providing device of claim 1, wherein the first vehicle number recognizer is different from the second vehicle number recognizer.

11. The vehicle service providing device of claim 1, wherein the first vehicle number recognizing method is different from the second vehicle number recognizing method.

* * * * *